US006950407B1

(12) United States Patent
Huddle

(10) Patent No.: US 6,950,407 B1
(45) Date of Patent: Sep. 27, 2005

(54) METHOD AND SYSTEM FOR PROVIDING SETTLEMENT OF INTERCONNECTED PACKET-SWITCHED NETWORKS

(75) Inventor: Scott R. Huddle, Washington, DC (US)

(73) Assignee: MCI, Inc., Ashburn, VA (US)

( * ) Notice: Subject to any disclaimer, the term of this patent is extended or adjusted under 35 U.S.C. 154(b) by 1103 days.

(21) Appl. No.: 09/670,365

(22) Filed: Sep. 26, 2000

(51) Int. Cl.[7] .......................... H04L 12/28; H04L 12/66

(52) U.S. Cl. ................... 370/254; 370/352; 370/395.1; 709/238; 709/224; 379/219

(58) Field of Search .......................... 370/352.392, 351, 370/254, 395.1; 709/238, 249, 224; 379/114.08, 379/219, 220.01

(56) References Cited

U.S. PATENT DOCUMENTS

| | | | | |
|---|---|---|---|---|
| 5,682,325 | A | 10/1997 | Lightfoot et al. | |
| 5,802,502 | A | 9/1998 | Gell et al. | |
| 5,898,673 | A | 4/1999 | Riggan et al. | |
| 6,005,926 | A | 12/1999 | Mashinsky | |
| 6,188,683 | B1 * | 2/2001 | Lang et al. | 370/352 |
| 6,721,405 | B1 * | 4/2004 | Nolting et al. | 379/133 |

FOREIGN PATENT DOCUMENTS

| | | |
|---|---|---|
| WO | 00/36815 | 6/2000 |

OTHER PUBLICATIONS

Nakamura et al., "A Pricing and Accounting Architecture for QoS Guaranteed Services on a Multi-Domain Network", Globecom '99, vol. 3, Dec. 5, 199, pp. 1984-1988.

* cited by examiner

*Primary Examiner*—Duc Ho

(57) ABSTRACT

An approach for supporting settlement of network usage associated with multiple network service providers is disclosed. A settlement system includes a processor that determines a settlement agreement among the network service providers. The settlement agreement specifies rate information associated with traffic exchange among the corresponding networks of the network service providers. A traffic monitor measures source traffic statistics, which is stored in a settlement database. Additionally, the settlement database stores the settlement agreement. The processor computes settlement information based upon the stored traffic statistics; the settlement information includes usage cost differential information for reconciliation of network usage among the various networks.

29 Claims, 9 Drawing Sheets

METHOD AND SYSTEM FOR PROVIDING SETTLEMENT OF INTERCONNECTED PACKET-SWITCHED NETWORKS

BACKGROUND OF THE INVENTION

1. Field of the Invention

The present invention relates to data communications, and is more particularly related to a settlement system for a public packet-switched network.

2. Discussion of the Background

The Internet remains based on a "sender keeps all" (SKA) model of settlements between networks. That is, no accounting is performed to exchange monies among the service providers, irrespective of the volume of traffic (or level of connectivity) that is transferred among the providers. This is in contrast with the voice telephony industry, which maintains a well-established system of settlements. Presently, Internet Service Providers (ISPs) conduct bilateral arrangements to exchange traffic at public exchange points at zero cost.

Beginning in 1969, the U.S. Advanced Research Projects Agency (ARPA) sponsored research to develop a distributed computer network. This sponsorship resulted in ARPANET—a packet-switched network employing traditional point-to-point links. ARPA thus initiated what developed into a much broader project to create the underlying Internet protocols: the Transmission Control Protocol and Internet Protocol (TCP/IP). Multiple U.S. government agencies were involved in the development of TCP/IP, including the National Science Foundation (NSF), the Department of Energy, the Department of Defense, and others.

The success of TCP/IP encouraged the NSF to fund a national backbone network, the NSFNET, beginning in 1985. The NSFNET first linked the five NSF supercomputing centers to the ARPANET. In 1986, the NSF further funded the creation of several regional Internet networks. The Internet then began the trend of explosive growth that continues today. By early 1996, the Internet reached ten million host computers.

As the popularity of the Internet soared through the early 1990s, it evolved from a network primarily used by the research and education community to a network that supports mission-critical business applications. This trend was accelerated by the decommissioning of the NSFNET in April 1995, when the functioning of the Internet was transitioned to commercial networks.

As part of this migration to the private sector, the NSF established and funded four Network Access Points (NAPs): the New York NAP (Sprint), the San Francisco NAP (Bellcore with Pacific Bell as the operator), the Chicago NAP (Bellcore with Ameritech as the operator), and the Washington, D.C., NAP (Metropolitan Fiber Systems, Inc.). The NSF defined a NAP as "a high speed network or switch to which a number of networks can be connected via routers for the purpose of traffic exchange and interoperation." The NSF foresaw an Internet architecture that hinged on these public interconnection points, which would be available to commercial Internet networks to attach and exchange traffic with other networks, thereby allowing their customers to communicate.

In addition to the NSF-funded NAPs, there are several other major public interconnection points in the United States, including MAE-East and MAE-West (MAE indicates Metropolitan Area Ethernet), operated by MFS, as well as the CIX-SMDS cloud, operated by the Commercial Internet Exchange (CIX). There are also international exchanges, including the London Internet Exchange (LINX), the Global Internet Exchange (GIX), and MAE-Paris.

The exchange of traffic at these public interconnection points occurs based on one of two models: bilateral or multilateral agreements. A bilateral agreement is typically a contract between two providers that specifies the exchange of customer traffic through one or more public interconnection points. Under the bilateral model, an Internet service provider pays the facility owner to place equipment (e.g., a router) to connect to the exchange network. The Internet service provider may then conduct bilateral agreements with other Internet service providers, which have networks that are connected at this point to exchange traffic, but is not obligated to establish such agreements. The exchange of traffic allows one Internet service provider to terminate traffic on the network of another Internet service provider.

A multilateral agreement is typically a contract among several providers to exchange customer traffic through a single interconnection point. The exchange point operated by the Commercial Internet Exchange offers an example of the latter. The CIX router was established in 1991 for the first commercial networks that were prohibited from exchanging traffic with the NSFNET as a result of the acceptable use policy (AUP). The CIX router offered privately funded networks the opportunity to exchange traffic, and the CIX agreement mandated that every member that connected would exchange traffic with all other networks connected to the CIX. Although no settlements are imposed, every CIX member pays a membership fee.

Regardless of whether it follows the bilateral or multilateral arrangement, an Internet interconnection agreement is based on the SKA financial model, in which the termination of traffic has no charge associated with it. Other interconnection arrangements in the telecommunications industry typically result in the transfer of revenue from one carrier to another. SKA does not contemplate that the end users paying for the termination of traffic by the providers. Such is the case in the cellular arena, in particular, collect or incoming cellular voice calls.

A number of reasons explain why the Internet environment has evolved differently from that of the telephony field. Unlike voice networks, where the flow of traffic is roughly balanced, traffic on the Internet tends to be asymmetric between information providers and entities that request information. Also in contrast to the voice network, Internet traffic is connectionless. The Internet utilizes a data stream that is segmented into a series of packets, each of which has the information necessary for routing to the final destination. The individual packets may take different routes to the final location and may even arrive at different times. At the destination, these packets are then reassembled into the original stream. Additionally, given the present architecture, it is can be difficult to calculate how much traffic is being exchanged, to determine who is responsible for originating the traffic, and to prevent fraud.

Although the NSF originally intended to fund the NAPs for five years, in August 1996 the agency announced the end of its sponsorship of the four NSF NAPs. The NSF had successfully overseen the transition of the Internet from government sponsorship to a wholly commercial structure. The NAPs provided a critical element by providing an interim, public infrastructure that ensured the continued functioning of the global Internet. However, although the NSF has withdrawn its support of the NAPs, clearly this architecture must again be transformed to a more rational economic model.

Accordingly, several developments have prompted the necessity of transforming the current Internet settlement architecture. First, the "neutral" nature of the NAPs has largely been eroded. The NAPs were established by the NSF to serve a public interest: namely, to prevent the balkanization of the Internet by establishing a public interconnection architecture. However, the NAPs are currently operated by third parties who may act opportunistically given that they are both ISPs and NAP operators. As both NAP operators and ISPs, these companies may offer customers the ability to connect to the NAPs (here the term NAP is used generically) as an inexpensive alternative to buying a direct connection to another ISP. Furthermore, the ISP/NAP operator not only can price its Internet access products to align with the NAP connection costs, but also can use the NAP facility to offer other services, including web site hosting, co-location of servers, and so on.

Second, the exponential growth of Internet traffic has largely overwhelmed the ability of the NAP infrastructure to scale adequately. The congestion occurring at the public exchange points poses a major problem for ISPs whose customers rely on their Internet access for mission-critical applications. This pressure has only increased as the Internet has been transformed from a network used primarily by the research and education community to one that is dominated by commercial ventures.

Finally, the explosive growth of the Internet access industry has spawned the formation of thousands of new ISPs. Most of these are smaller, regional networks are not investing in building national infrastructures. Rather, they are relying on the SKA model to ensure that their traffic is transported across the global Internet at no cost other than the coordination costs to arrange interconnection agreements. The SKA model provides an unjust result in this respect. The SKA system is not efficient, and therefore not sustainable.

Policy changes that are enacted by some of the major backbone providers provided the first indication that this architecture could no longer continue as it was first conceived. Among other requirements, some carriers demand that peer networks attach to a minimum number of interconnection points and maintain a national network of a certain capacity. All of these metric based approaches are clearly flawed—they are a substitute for evaluating a business relationship and lead to inefficient arrangements.

Clearly, the viability of the NAP architecture is under serious question. There seem to be two alternatives which result: the interconnection agreements concluded at the NAPs reflect the relative value of the good (i.e., traffic or routes) that is being exchanged, or the NAPs are replaced by direct, bilateral interconnection arrangements between networks that are priced according to the balance of traffic flows or levels of connectivity.

To better understand the need for a settlement system for the Internet, it is useful to examine settlement systems that are employed by the telecommunication carriers. Interconnection charges levied by U.S. Local Exchange Carriers (LECs) for transport and termination on the local network constitute a major cost of business for other communications providers. These access charges have several goals, the foremost of which is to cover LEC infrastructure costs.

Interexchange Carriers (IXCs) pay access charges to the LECs for both ends of a long-distance call: origination and termination. Cellular companies pay access charges only if the calls terminated on the LEC network. However, in cases where LECs act as long-distance carriers, they generally pay the same fees as IXCs. Further, unlike the Internet, carriers in the voice telephony market are required by law to interconnect with other carriers to enhance the competitive environment.

The current economic model of zero settlements, combined with the rapid international expansion of the Internet, presents a challenge to backbone network providers. A foretaste of this problem has already become evident in the United States as more and more regional networks connect to the NAPs. Under the current SKA model, these regional networks interconnect for free with national-level networks that have invested large amounts of capital and other resources to construct a sophisticated infrastructure. The regional networks thus benefit by receiving access to the rest of the Internet from the national-level provider, and gaining access to a nationwide infrastructure at no cost.

The problem for the U.S. national-level networks becomes exacerbated as the non-U.S. networks seek the same interconnection rights. Essentially, a non-U.S. network that concludes an interconnection agreement with a major U.S. ISP will gain transport rights for its traffic across the United States. The interconnecting U.S. network does not benefit equally because typically the international network will be confined to a single country and carry a very limited number of destinations.

Additionally, interconnection arrangements can fail when different networks have different customer focus that result in unequal traffic streams. FIG. 8 shows a diagram of the traditional interconnection of the networks without settlement capability involving a third party Internet service provider (ISP). Assuming provider A is a hosting ISP, supporting its service by maintaining a national network 801. As seen in FIG. 8, the network 801 includes a web server 803. In addition, it is assumed that provider B is a national access provider, whereby network 805 enables a user station 807 to connect to the Internet. In this example, the user station 807 seeks to communicate with the web server 803 to down load information.

In the example of FIG. 8, the two nationwide networks 801 and 805 have a connection 809 on the East coast (e.g., Washington, D.C.) as well as a connection 811 on the West coast (e.g., San Francisco). Such a configuration is a common peering arrangement, whereby the traffic is geographically shared. The manner in which traffic traditionally flows on the Internet between two networks (e.g., 801 and 805) is known as "hot potato routing." That is, traffic that is transmitted to a destination point is off loaded at the earliest interconnection point to the other network. For example, user station 807 requests information from the website on web server 803, the initial traffic follows path 813; the request is transmitted to network 801 at the earliest interconnection point, which is located in San Francisco. Upon receiving the request from user station 807, the web server 803 generates data traffic over path 815 because the Washington, D.C. connection 811 is the first interconnection point. Once the web traffic, which is significantly greater than the request traffic from user station 807, enters network 805, the traffic travels across the entire network 805. Under some scenarios, the connections 809 and 815 may not be economically practical (e.g., geographical location, distance, etc.) for either or both of the ISPs A and B. If one of the providers requires a disproportionate amount of traffic, then maintaining connectivity with the other provider is not cost effective. At present, no settlement systems exist to reconcile the utilization of the connections 809 and 815 by the Internet service providers A and B. In this example, provider A is a hosting ISP, while provider B is an access ISP, then the network 805 of provider B will carry a larger traffic load for a longer distance than provider A.

If these networks 801 and 805 are similar types of networks and provide similar kinds of access services, the networks 801 and 805 would contain an equal mix of hosting traffic and access traffic. However, because web traffic, which is the dominant traffic on the Internet, is much larger than the request, there exists great asymmetry of traffic loading between the two networks 801 and 805. For instance, the request may be 60 bytes in length, while the web traffic response may be a 100 Mb file.

It is therefore noted that the host ISP (i.e., provider A) carries very little traffic over large distances and has very little requirements for a nationwide network in order to carry the amount of requests to its customers. Provider A only needs a few local connections, which are relatively inexpensive, compared to the expensive long haul connections associated with the nationwide networks. Accordingly, the access ISP (provider B) is encumbered by a disproportionately large traffic load, thereby providing a disincentive to provider B from interconnecting with provider A. If the asymmetric traffic pattern continues, provider B will most certainly opt out of the interconnection arrangement. Even if provider B chooses to remain in the business relationship with provider A, provider B has no incentive to upgrade the interconnection links 811 and 813. The end result is that the Internet is not optimally connected. The SKA interconnection arrangement results in either a lack of interconnection or one that lacks economic incentives to improve. This can cause network congestion, slowing network connections for all, and a reduction in network connections.

To address this imbalance and inequity in the interconnection agreement, one conventional approach seeks to implement rules or metrics. In other words, the access provider may require that the hosting provider meet certain parameters (e.g., the hosting provider must have a nationwide network) to ensure that the traffic imbalance is minimized. A drawback with a rules model is that many providers will be excluded, as the traffic asymmetry is an inherent problem in a costless (or zero asset) scheme. This rules-based approach may exclude a provider, even though the provider's network supplies the best route. For example, if network 817 of provider C presents a more efficient and cost effective path 819 to user station 807, the route cannot be realized under the SKA model.

In the case of two providers, and in general, an ISP can only sustain price discrimination if it retains control over interconnection, and cannot sustain price discrimination against entry if free interconnection is mandated. In the case of three or more providers, there is no nondiscriminatory price that reaches the socially optimal and efficient state. There is a discriminatory price that reaches this state, but only if free interconnection is not required. If free interconnection exists, it is not possible to attain the optimal state of connectivity [1].

Therefore, because of network externalities, price discrimination is desirable in order to attract the maximum number of connected users. Second, interconnection between Internet networks must also be priced efficiently.

From the above discussion, it is noted that the SKA settlement system on which the Internet is based today is flawed. To function efficiently in the SKA model, two conditions must be fulfilled: the level of connectivity must be roughly equal between networks; and the costs of transporting and terminating traffic must be less than the costs of developing a payment scheme. Because the first condition holds true only for a limited number of networks, there is little incentive for networks that transport a large amount of traffic to many distant destinations to connect with networks that transport traffic to only local destinations. Because the amount of traffic exchanged is often imbalanced, a structure of zero payments places an unequal burden on networks that have invested in a broad national infrastructure and carry a large number of routes to distant destinations. Thus, the lack of incentives to interconnect—both in terms of money and connectivity value—prevents the Internet from continuing to grow as a collection of networks. The theory of positive network externalities reveals that a network gains in value with every additional user. However, as long as ISPs are reluctant to interconnect their networks, then the social optimum—meaning the maximum number of users that can connect to the Internet —cannot be attained.

Only by establishing an efficient method for settlements between providers can the social optimum be achieved. Efficiency is defined here as a system that is technically workable, that fairly compensates all providers, and promotes interconnection among networks.

Closely tied to the question of the financial model is the challenge of the physical interconnection architecture. As previously discussed, the NSF created the NAPs in order to seamlessly transfer the Internet from the public to the private sphere. Although the transition has been successfully accomplished, the exchange points encounter two problems: they are no longer considered neutral; and the NAP infrastructure is not scaling adequately to the exponential increase in the volume of traffic. If an efficient pricing mechanism were established for interconnection, then all parties would be properly motivated to create more efficient physical facilities for interconnecting networks, which would in turn promote the overall goal of increased connectivity.

Based on the foregoing, there is a clear need for improved approaches to settlement of traffic exchange in a data communication environment that promotes a socially optimal objective of providing all hosts with improved Internet connectivity.

There is also a need to adequately compensate network providers for their infrastructure investments and continued upgrades of existing networks.

There is also a need to allow new network providers to expand their networks and to reduce network costs, while fairly compensating incumbent Internet service providers.

There is yet a further need to provide a mechanism that encourages Internet service providers to interconnect their networks, thereby significantly increasing the Internet user base.

SUMMARY OF THE INVENTION

According to one aspect of the invention, a method for providing settlement of traffic exchange associated with a plurality of networks of a plurality of network service providers comprises determining a settlement agreement between a first one of the network service providers and a second one of the network service providers. The settlement agreement specifies rate information associated with traffic exchange between the corresponding networks of the first network service provider and the second network service provider. The method also encompasses monitoring the traffic exchange between respective networks of the first network service provider and the second network service provider, and computing settlement information based upon the monitoring step, the settlement information includes usage cost differential information that is based upon the rate information. Under this approach, a socially optimal number of hosts can connect to the Internet.

According to another aspect of the invention, a communication system for supporting settlement of network usage associated with a plurality of network service providers comprises a plurality of networks corresponding to the plurality of network service providers. A processor is configured to determine a settlement agreement between a first one of the network service providers and a second one of the network service providers. The settlement agreement specifies rate information associated with traffic exchange between the corresponding networks of the first network service provider and the second network service provider. A traffic monitor is configured to measure a first source traffic originating from a first one of the plurality of networks to a second one of the plurality of networks and a second source traffic originating from the second network to the first network. A settlement database communicates with the processor; the database stores the settlement agreement and traffic statistics corresponding to the measured first source traffic and the second source traffic. The processor is configured to compute settlement information based upon the stored traffic statistics. The settlement information includes usage cost differential information that is based upon the rate information. Under this arrangement, network service providers are fairly compensated for their infrastructure investments.

In a still further aspect of the invention, a computer-readable medium containing program instructions for execution on a computer system, which when executed by a computer, cause the computer system to perform method steps for providing settlement of traffic exchange associated with a plurality of networks of a plurality of network service providers. The method steps include determining a settlement agreement between a first one of the network service providers and a second one of the network service providers. The settlement agreement specifies pricing information associated with traffic exchange between the corresponding networks of the first network service provider and the second network service provider. The method also encompasses receiving traffic statistics of the respective networks of the first network service provider and the second network service provider, and computing settlement information based upon the monitoring step, the settlement information includes usage cost differential information that is based upon the pricing information. The above arrangement permits small network service providers to expand their networks, while compensating the incumbent network service providers.

In a still further aspect of the invention, a memory for storing settlement information associated with a plurality of networks of a plurality of network service providers comprising a data structure. The data structure includes an account field for storing a unique account number of one of the plurality of network service providers. Additionally, the data structure includes a pricing field for storing at least one of a global rate information and a specific pricing information as specified by the one network service provider. Further, the data structure encompasses an interconnection list record that comprises a network service provider field for storing an identification information of another network service provider, a traffic statistics field for storing traffic statistics of a connection associated with the other network service provider, a discount rate field for storing pricing information, and a usage cost differential field for storing a difference between network usage between a network of the one network service provider and another network of the second network service provider. Under the above arrangement, expansion of the user base of the Internet is stimulated.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. For instance, repeated use of telecommunications-related products/services are used to provide a consistent exemplary industry application, but are in no way intended to limit the scope of the invention to applicability to only this industry since universal application to any other product/service arena is intended.

In some instances, well-known structures and devices are depicted in block diagram form in order to avoid unnecessarily obscuring the present invention. Although the present invention is discussed with respect to exemplary protocols, computer languages, and operating systems, the inventions can be implemented on any computer system regardless of protocols, languages, or operating system platform.

The present invention provides a settlement system for an interconnection of multiple packet-switched networks using a "Pay to Send" (PTS) financial model, which fairly compensates the parties that are involved in the traffic exchange based upon the traffic that each party "sources" onto the other parties' networks.

The settlement system, which can act as a "packet clearing house" (PCH), includes network devices that collect all Internet routes at the exchange as well as the current rates and associated pricing information for each route from the various network providers. According to one embodiment of the present invention, the network devices include an ATM (Asynchronous Transfer Mode) switch and a router. These routes are distributed back to each of the parties at the exchange in two modes: a "transparent" mode and "blind" mode. In the transparent mode, each party has knowledge of the ultimate destination route for a packet, in which the traffic is forwarded directly between one party and another other party. In the blind mode, the parties effectively view the PCH's network device as the destination route, and forwards traffic onto the ultimate destination network.

Figure 1:
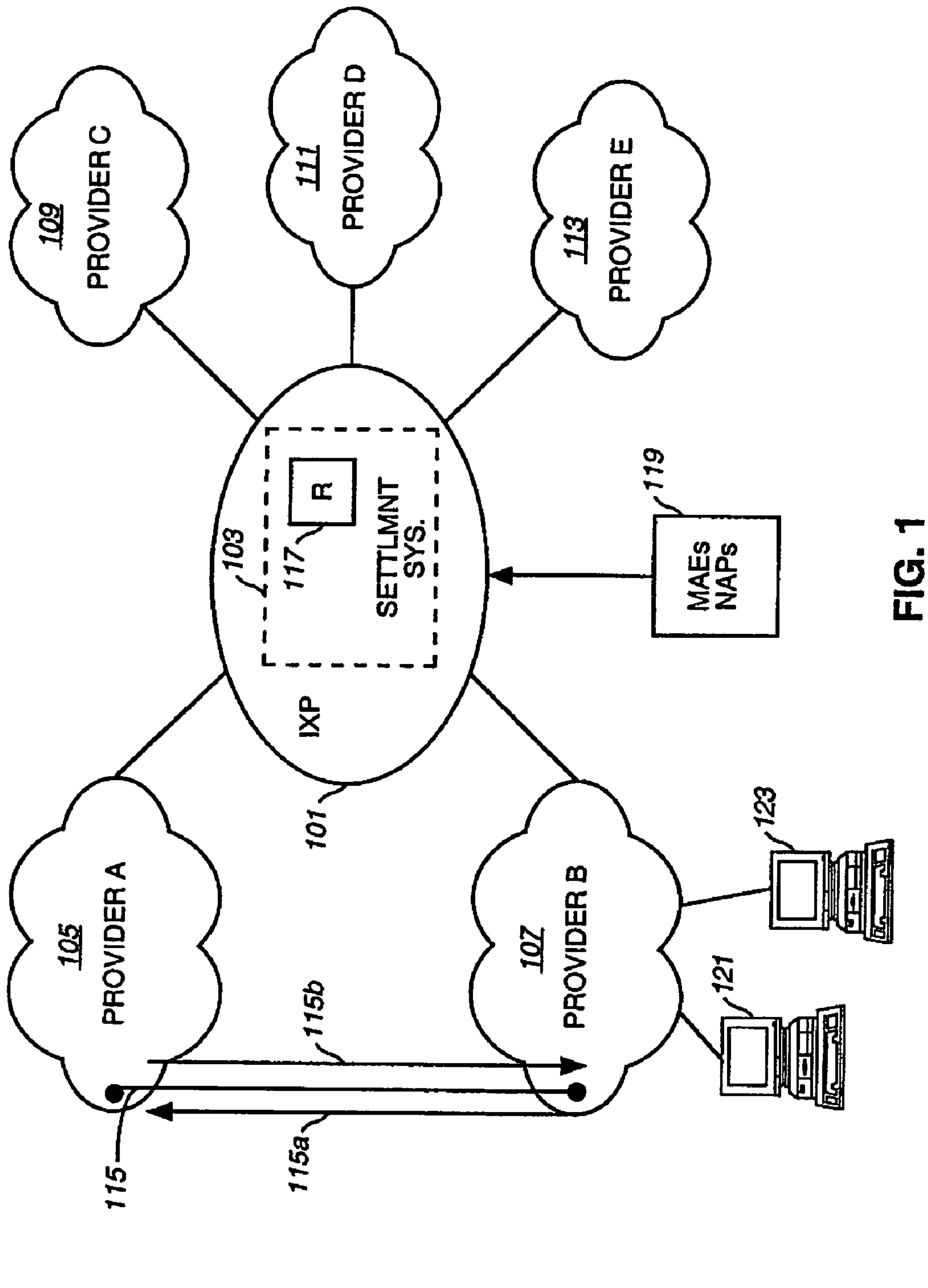
FIG. 1 is a diagram of the interconnections of multiple networks of different network service providers (NSPs) using an exchange point that has a settlement system, according to an embodiment of the present invention.

FIG. 1 shows a diagram of the interconnections of multiple networks of different network service providers (NSPs) using an exchange point that houses a settlement system, according to an embodiment of the present invention. According to an exemplary embodiment of the present invention, the network service providers supply services relating to the global Internet, and hence, are herein referred to as Internet Service Providers (ISPs). In other words, the term Internet Service Provider (ISP) generally pertains to a particular type of network service provider that concentrates on providing access to the global Internet. It is recognized by one of ordinary skill in the art that the present invention has applicability to any type of packet-switched network.

As shown in FIG. 1, an Internet Exchange Point (IXP) 101 includes a settlement system 103 and serves as a central hub for interconnectivity among the networks 105, 107, 109, 111, and 113 of Internet service providers A, B, C, D, and E, respectively. These networks 105, 107, 109, 111, and 113 interconnect with each other in one of two ways: a dedicated or direct connection (115?), or through an Internet exchange Point (IXP) 101. Using the IXP 101, a service provider can exchange traffic with a number of different ISPs, which advantageously provides interconnection without having to provide many separate circuits and to manage each circuit individually. The IXP 101, for example, can set up a connection between providers A and B so that these providers can exchange traffic. Additionally, providers A and B have a separate dedicated connection 115 to exchange traffic if these providers have additional requirements (which can be based upon technical or business needs). The IXP 101 can also connect with other MAEs/NAPs 119 to provider better local or global connectivity.

ISPs A, B, C, D, and E provide both a physical layer interface and a logical connection to the Internet "cloud." The cost of a connection to a particular ISP is a combination of both of these components. The physical interface will typically include costs for the access circuit, router, terminal servers, and other hardware the ISP uses to connect the customer to its site. The ISP will typically interconnect multiple sites with leased lines to form a backbone in a number of possible topologies. The ISP may also connect the network to Internet exchange points such as the NAPs. There are a number of other pieces that form the logical connection for IP (Internet Protocol) service, including route announcements, address space, and traffic on the backbone.

The settlement system 103 within IXP 101 follows a PTS model. This approach places the burden on the parties that source the traffic because they are better positioned than the receiving party to control the amount of traffic that is exchanged. Under the PTS model, two networks 105 and 107, which are directly connected via connection 115, can reconcile network usage directly. It should be noted that the negotiated rate for traffic from network 105 to network 107 is independent of the rate associated with traffic in the opposite direction (i.e., from network 107 to network 105). For instance, the settlement agreement between provider A and provider B may dictate that the channels 115*a* and 115*b* be 80 Mbps and 100 Mbps, respectively.

More likely than not, the channel rate requirements are different for the two providers. If one of the providers performs web hosting and the other is an access provider, for instance, the provider that offer web hosting services would source a greater amount of traffic, thus, may be required, under a settlement agreement, to pay a higher rate than the access provider. Also, if the networks are different in geographic scope (i.e., one is a global provider and one is a local provider), the local provider would most likely have to pay a higher rate to send traffic to the global provider than the global provider would have to pay to the local provider to account for the difference in infrastructure investment costs.

Depending on the business relationship between providers A and B, providers A and B may set up their own monitoring systems (not shown), according to one embodiment of the present invention. The monitoring systems (not shown) can readily measure the amount of traffic that is sent and received to reconcile the amount of traffic that was exchanged between the networks 105 and 107, according to the terms of the settlement agreement.

In the case of multiple service providers (i.e., greater than two), the monitoring and reconciliation of the traffic exchange increase in complexity. As a result, the IXP 101 is utilized to facilitate better interconnections between the providers A–E by encouraging providers to offload the chore of measuring traffic and negotiating rates to the IXP 101. IXP 101 facilitates neutral interconnection among the networks 105, 107, 109, 111, and 113 of network service providers A, B, C, D, and E. In a practical system, the number of providers can be several hundreds. The IXP 101 provides the physical space in which the various providers A–E can interconnect. As will be more fully described below, the settlement system 103 has a switch that is provided by the IXP 101. In an exemplary embodiment, each of the network service providers A–E has a line termination equipment that is collocated with the settlement system 103.

Settlement system 103 within the IXP 101 optionally contains a router 117 to assist with routing traffic among the various networks 105, 107, 109, 111, and 113. The optional router 117 supports the "blind" mode of operation, which is further discussed below. Router 117 enables the IXP 101 to provide Layer 3 ("IP") services; by contrast, traditional IXPs merely provide Layer 2 (e.g., ATM, Frame, or MPLS) interconnections between the various providers A–E. As will be later described, Layer 3 services permit great flexibility in the manner traffic exchange is conducted.

According to one embodiment of the present invention, the IXP 101 is managed by a neutral operator, which can charge service fees to the various network service providers A–E for providing this interconnection service. It should be noted that in situations in which there is large amount of traffic exchanged between certain network service providers, a dedicated connection 115 between the two networks 105 and 107 can be established. Another reason for using a dedicated connection 115 may be that the providers A and B have a business relationship that dictates such an arrangement.

The settlement system 103 permits any one of the providers A–E to interconnect their respective networks with any other one of the providers A–E. For the purposes of explanation, it is assumed that provider A can interconnect with either one of the other networks 107, 109, 111, and 113 to reach a certain destination. In essence, provider A seeks to enter into a settlement agreement with a particular provider (e.g., B, C, D, or E) to exchange traffic. As will be explained below, the settlement system 103 supplies the necessary information to provider A to make an informed choice regarding which network service provider best satisfies the requirements of provider A. The information may include rate information that are associated with the connection, as shown in Table 1, below. It is recognized that the information can optionally contain more detailed pricing information, for example on a per-route basis.

TABLE 1

| PROVIDER | RATE INFO. |
|---|---|
| B | $6/Mbps |
| C | $8/Mbps |
| D | $7.50/Mbps |
| E | $15/Mbps |

Table 1 lists the traffic rates and prices for the available service providers. As indicated by Table 1, provider B is willing to receive traffic at a rate of $6/Mbps, which is the lowest cost among the providers B–E. This information is supplied to provider A by the settlement system 101 via a web server (not shown). The web server collects rate information from each of the network service providers A–E. Accordingly, the rate information of the network 105 of provider A is known to the other providers B–E; for example, provider A may specify a rate of $9/Mbps. As will be described with respect to FIGS. 3 and 4, the network service provider inputs interconnectivity selection information to establish a connection between network 105 and network 107 based upon a predetermined parameter. The parameter may include the collected rate information, performance metrics (e.g., latency, traffic peaks, etc.) of the connection, or the business relationship between the network service providers.

Assuming the rate of provider B is acceptable to provider A and vice versa, the settlement system 103 creates a settlement agreement between providers A and B. The settlement agreement captures the agreed rate information associated with traffic exchange between the networks 105 and 107, corresponding to provider A and provider B, respectively. Next, the settlement system 103 monitors the traffic that provider A sources to network 107 of provider B as well as the traffic that provider B sources to network 105 of provider A, and computes the settlement information. The settlement information includes usage cost differential information that is based upon the rate information. In other words, the settlement system 103 calculates the difference between the amount of traffic that is originated by provider A and the traffic that is originated by provider B. The usage cost differential information, thus, effectively indicates how much provider A is owed if the network usage by provider A is relatively less than that of provider B, according to the terms of the settlement agreement. On the other hand, if provider A does not source as much traffic as that of provider B, in light of the settlement agreement, then provider A is due compensation by provider B.

Figure 3:
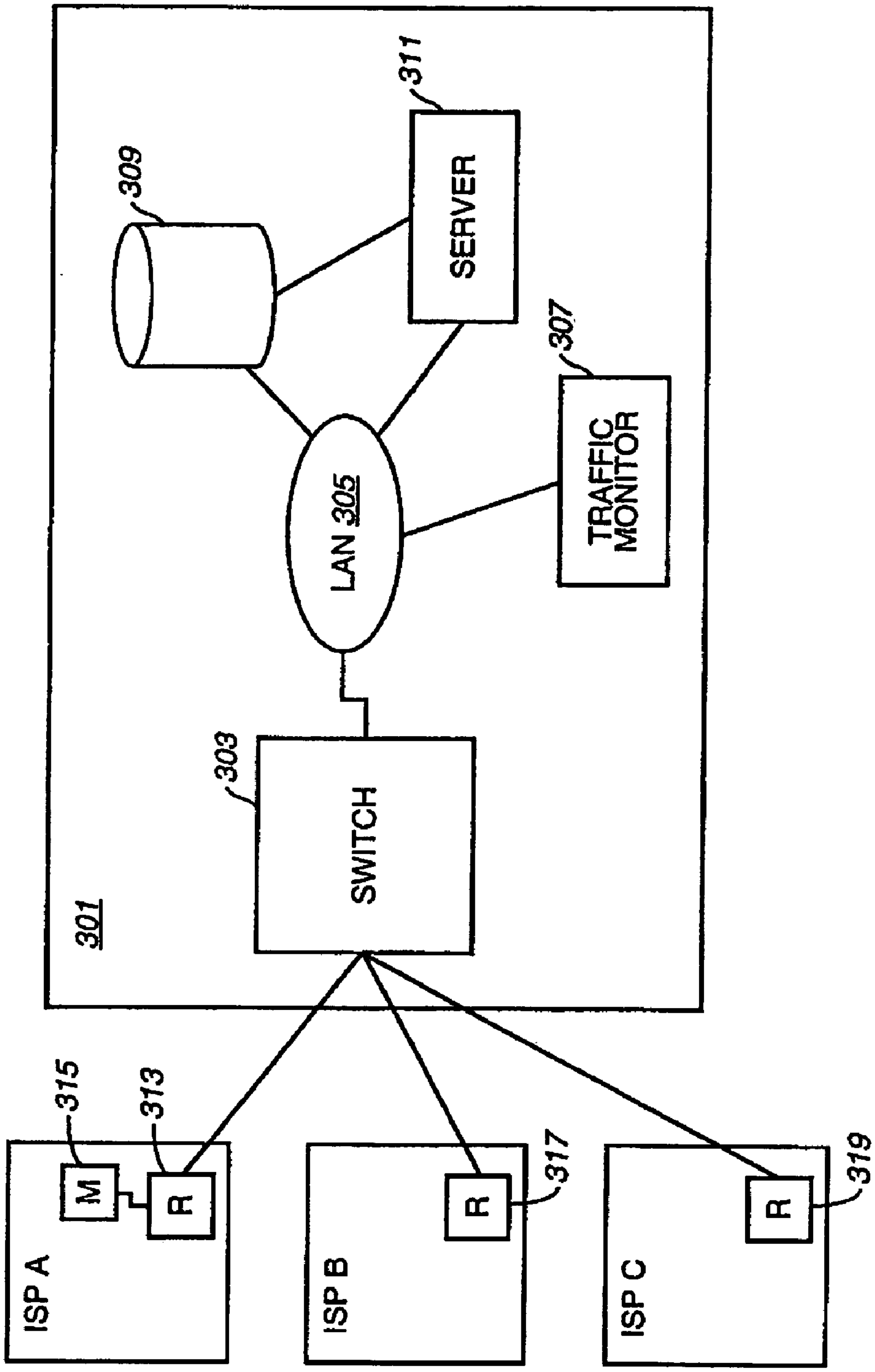
FIG. 3 is a diagram of a settlement system to provide network usage reconciliation, according to an embodiment of the present invention.

Effectively, IXP 101 with the settlement capability as provided by settlement system 103 acts as a packet clearing house (PCH), serving as an intermediary for the various providers A–E to collect traffic statistics for use in the settlement process. At the PCH 101, each provider could optionally logically or physically interconnect with all of the providers or could logically or physically connect with a clearing house network device; e.g., switch 303 (FIG. 3). A provider posts and views "bids" for various Internet routes within the settlement system 103 and select those routes for itself to send traffic (the "transparent" mode) or for forwarding via the clearing house itself (the "blind" mode).

Each service provider at the PCH 101 has a "trading account" at the packet clearing house via a PCH portal—on a web server (FIG. 3). This portal allows a network operator of an ISP to securely post bids and execute agreements with the other operators, obtain interactive statistics and traces, view a summary of their account (FIG. 2A), and interact with the operations staff of the PCH 101. The operator of the PCH 101 operates a physically secure facility for the placement of carrier equipment and interconnection with local and long distance telco facilities. The PCH 101 may offer additional services such as packet traces, traffic statistics collection, and fraud management.

As previously mentioned, the settlement system 103 can operate in either the "transparent" mode or the "blind" mode. In the transparent mode, each of the participating service providers knows the ultimate destination route, such that the traffic is forwarded directly between one party and another other party. As a neutral entity, the IXP 101, as a PCH, acts as a proxy agent for the various providers A–E to provide a "blind" service to forward traffic to the lowest cost providers. When provider A inputs a desired rate into the settlement system 103, the IXP 101 looks for another provider that accepts the offer of provider A to thereby establish a settlement agreement between the two parties. Specifically, the settlement system 103 makes this rate information of provider A available to all of the other providers B–E.

In fact, all the providers A–E have open knowledge of the connections as specified by the providers A–E, thus permitting a provider to choose the best route based on, for example, performance metrics and cost. Router 117 possesses the functionality to select based upon the speed of the interface as well as various other metrics (e.g., latency and delay). The rate information that are supplied by the providers A–E may be based upon any number of schemes (e.g., tiered pricing, linear function, non-linear function, etc.). The IXP 101 collects such information from all of the various providers A–E, allowing transparent knowledge of the collected information so that any provider who interconnects possess that information to select a route based on cost or other parameters. Alternatively, the provider may choose based upon a business relationship, or latency or delay metrics.

Figure 5:
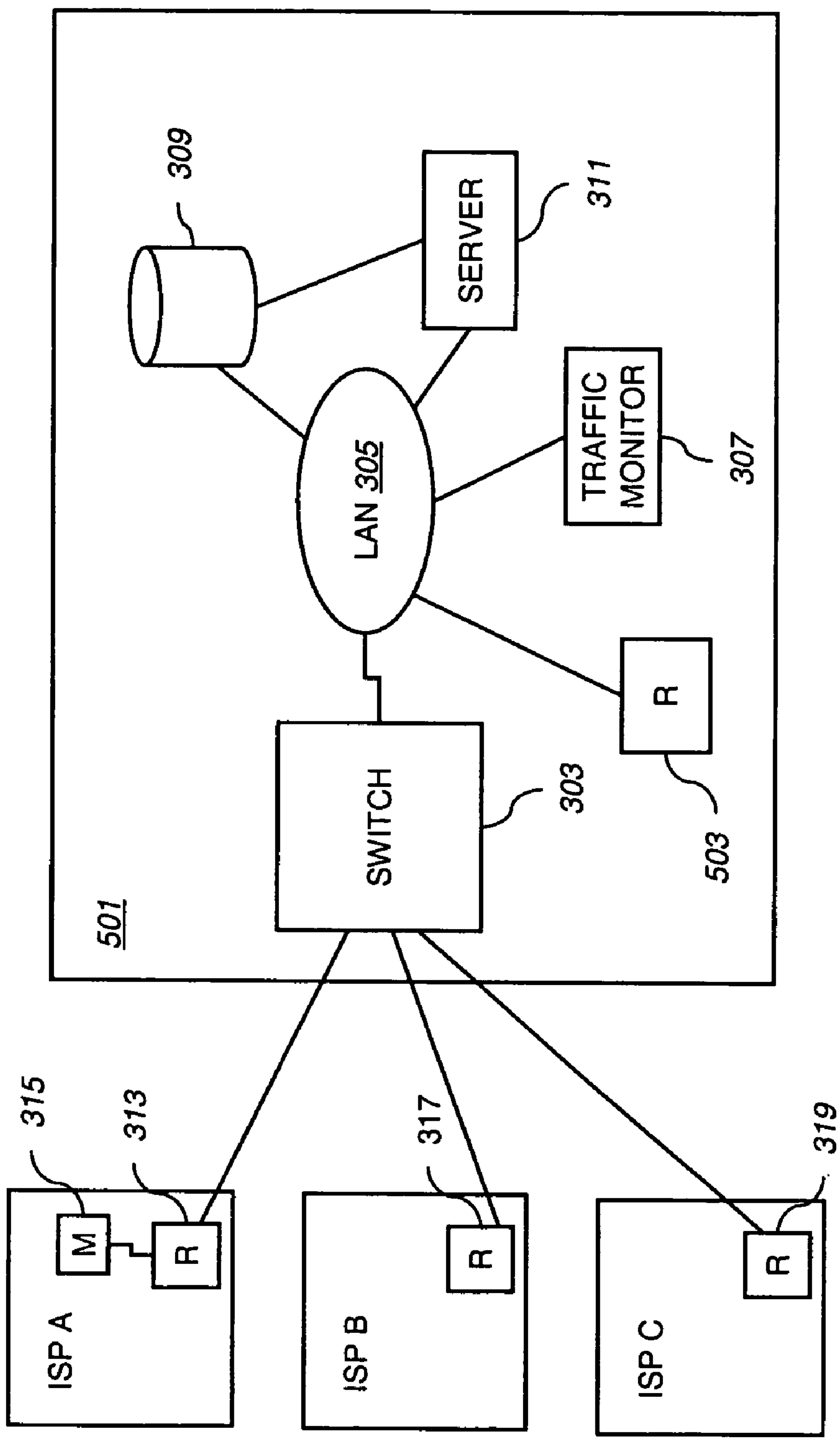
FIG. 5 is a diagram of a settlement system with routing capability to provide network usage reconciliation, according to an embodiment of the present invention.

The other mode of operation is the blind mode, whereby the IXP 101 provides a blind front for selling termination of traffic by utilizing router 117. The settlement system that supports this operation is shown in FIG. 5. In the blind mode of operation, for example, the IXP 101 may allow a provider that has additional wholesale capacity to sell the termination of that excess capacity to the other providers at a rate that is perhaps lower than it might sell to other wholesale customers, without the other providers having knowledge of the identity of the offering provider. By introducing a blind front, providers are more incline to exchange traffic and to offer greater savings. For example, the provider may have that excess capacity available only for the next 30 days; instead of under utilizing its network, the provider can offer the excess capacity at a greatly discounted rate. Negotiating a short term agreement is traditionally difficult to conduct. However, this difficult is overcome by the blind mode of operation.

Under the PTS model, settlement system 103 promotes more interconnection among the networks 105, 107, 109, 111, and 113 of network service providers A–E, respectively, because the NSPs A–E can be compensated for any network improvements and/or expansion that they have undertaken. In particular, settlements allow small providers to grow their networks and reduce their costs, while fairly compensating the larger provider for their significant infrastructure costs.

An efficient method for settlements encourages a socially optimal outcome, namely, inducing the maximally efficient number of connected hosts to the Internet. Without a settlement mechanism, the Internet can never be as connected as would be possible if interconnection fees were established. The settlement system 103, essentially, removes the burdensome interconnection responsibilities from the providers A–E. As an independent entity, the IXP 101 can bill for its services directly to the participating providers A–E.

Figure 2A:
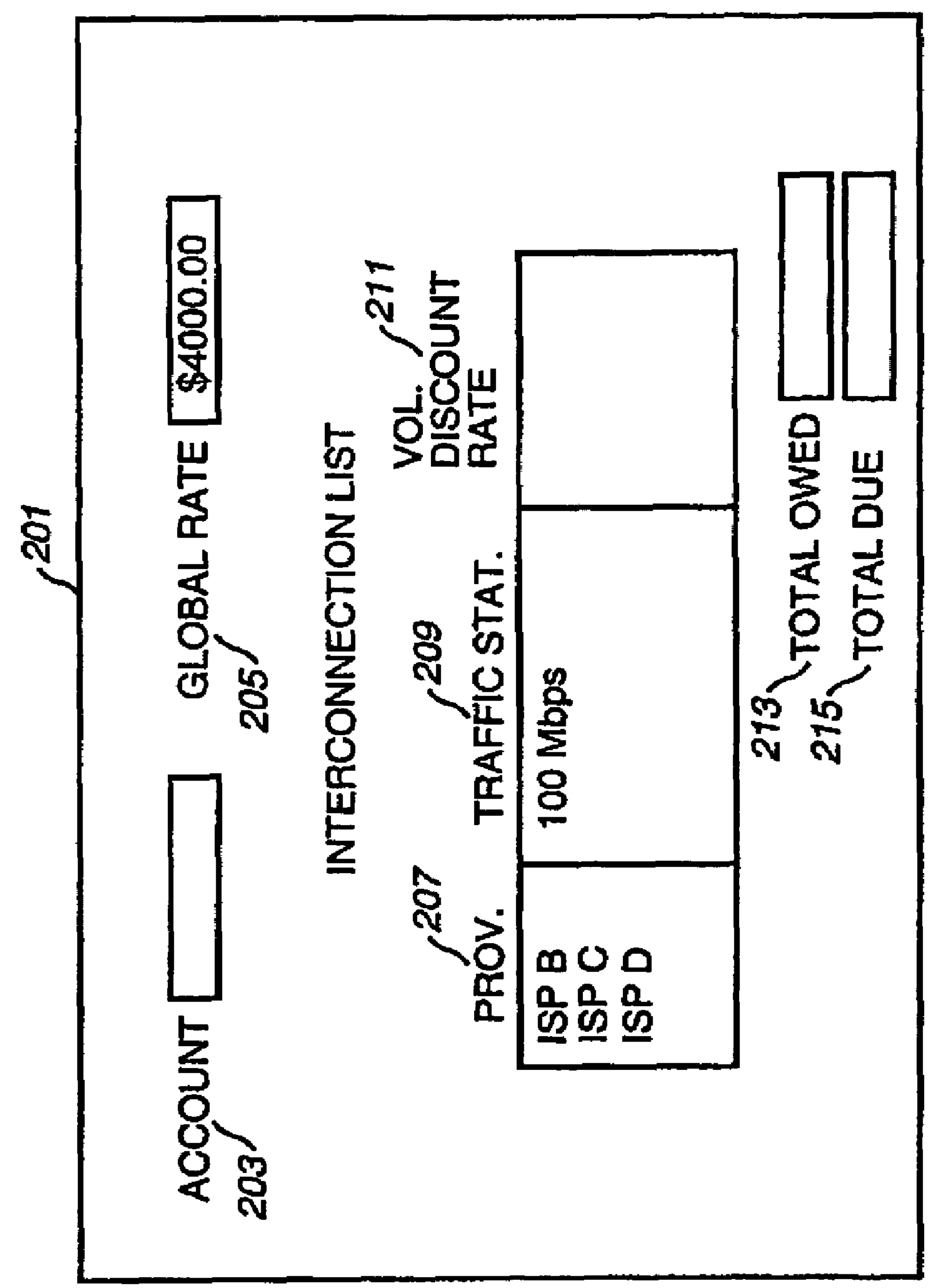
FIGS. 2A and 2B are diagrams of an account statement screen and of a data structure, respectively, that are used in the settlement system of FIG. 1.

FIG. 2A shows a diagram of an account statement screen that is used in a settlement system, according to an embodiment of the present invention. An account statement screen 201, according to one embodiment of the present invention, can be accessed via a web server (FIG. 3). The account statement screen 201 includes an ACCOUNT field 203 for a unique account number of a particular network service provider, and a GLOBAL RATE field 205. The GLOBAL RATE field 205 displays a generic rate that the particular network service provider charges the other network service providers for interconnection. The statement screen 201 also contains a listing of interconnections for which the particular network service provider has established a connection or seeks to establish a connection. A provider (PROV.) field 207 displays the names of the other network service providers that have exchanged traffic with the particular network service provider that has the account.

The following information is associated with the listing of interconnections: a TRAFFIC STATS field 209 for storing traffic statistics, and a VOL. (volume) DISCOUNT RATE field 211. The VOL. DISCOUNT RATE field 211 contains a specific rate that is applicable to a particular network service provider; the field 211 provides the capability to individually offer discounts to the other providers. Preferred partners, for example, may be entitled to a greater discount than that of the global rate because of the large volume of traffic. If the field 211 is unspecified, the global rate is used as the default rate.

According to one embodiment of the present invention, the statement screen 201 provides an entry screen for the fields 205, 207, and 211. For example, a global rate can be specified simply by entering the value in the GLOBAL RATE field 205. In addition, an interconnection can be established by entering the desired ISP in the PROV. field 207, along with the VOL. DISCOUNT RATE field 211, if applicable. The entry of the ISP in the PROV. field 207 triggers the establishment of a physical or virtual connection; this also establishes polling of the traffic between the interconnected networks. This interconnectivity selection information (which includes fields 207 and 211) is entered through a web server and stored in a settlement database (FIG. 3).

Furthermore, the statement screen 201 specifies the total amount that is owed to the network service provider via a TOTAL OWED field 213. A TOTAL DUE field 215 is provided to indicate the amount that the provider owes for usage of the connections with the various network service providers. For example, if provider A, as a large provider, is owed money, the TOTAL OWED field 213 would display the amount that provider A is entitled to as computed by the settlement system 103. In this case, the TOTAL DUE field 215 would contain "$0.00". Alternatively, a single field can be used to indicate the adjustment amount.

Fields 213 and 215 are populated when the reconciliation process takes place, which may occur at some periodic term (e.g., monthly, quarterly, a predetermined interval). According to an exemplary embodiment, the money is exchanged with only the PCH 101, which individually resolves the accounting with each of the network service providers A–E. Thus, network service providers A–E actually enter into an agreement with the PCH 101, and not the individual network service providers.

Figure 2B:
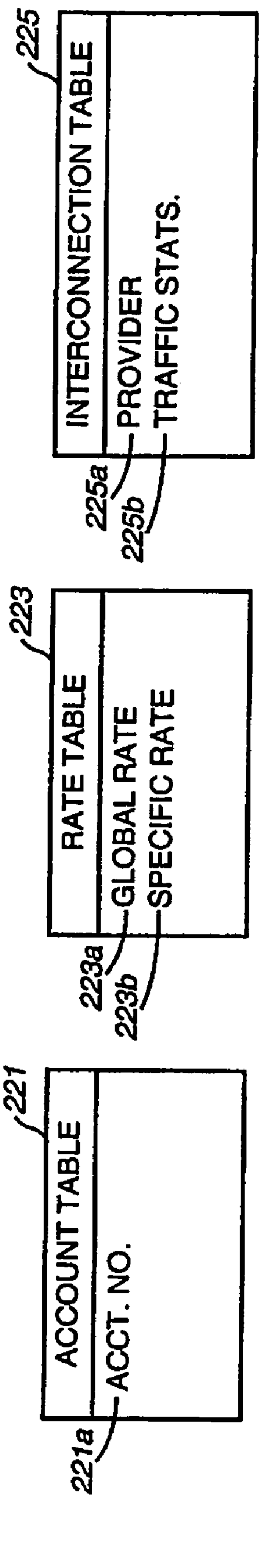

FIG. 2B shows the data structure that is used in the settlement system, in accordance with an embodiment of the present invention. A settlement database, which is described in the settlement system of FIG. 3, stores the following tables: Account table 221, Rate table 223, and an Interconnection table 225. The Account table 221 has an Account No. field 221*a*. The Rate table 223 includes a Global rate field 223*a* and a Specific rate field 223*b*.

These tables 221, 223, and 225 store information that are retrieved by a web server to populate the account statement screen 201 of FIG. 2A. In particular, the Account No. field 221*a*, the Global rate field 223*a*, the Provider field 225*a*, and the Traffic Statistics field 225*b* correspond respectively to the following fields of FIG. 2A: ACCOUNT field 203, GLOBAL RATE field 205, provider (PROV.) field 207, and TRAFFIC STATS field 209. Additionally, the Specific rate field 223*b* corresponds to the VOL. (volume) DISCOUNT RATE field 211 (FIG. 2A).

FIG. 3 shows a diagram of a settlement system that provides network usage reconciliation, according to an embodiment of the present invention. A settlement system 301 includes a switch 303 that is connected to a Local Area Network (LAN) 305. The LAN 305 connects to a traffic monitor 307, which can be any type of standard monitoring device; according to an exemplary embodiment, the traffic monitor 307 is a workstation that is loaded with traffic monitoring software. The LAN 305 can be implement using any one of following technologies: Gigabit Ethernet, 100/10 Ethernet, Token Ring, FDDI (Fiber Distributed Data Interface), and ATM (Asynchronous Transfer Mode). A web server 311 is attached to the LAN 305 and has a direct connection to a settlement database 309. The settlement database 309 can be accessed via the LAN 305. In an exemplary embodiment, the web server 311 is a server-class IBM-compatible running a Microsoft Windows NT operating system; however, as recognized by one of ordinary skill in the art, other computing and operating platforms can be utilized.

To specify, for example, which ISP is to be interconnected using the account statement screen of FIG. 2, any one of the ISP operators can access the web server 311 using a client station (not shown) to access the web server 109 using standard web browsers (e.g., Microsoft Internet Explorer, Netscape Navigator, and etc.). To serve the client stations (not shown) of the ISPs, web server 311 may execute JAVA applications (e.g., JAVA servlets) to collect information from the ISP. JAVA provides operating system independence, enabling language flexibility and code-reuse. The client stations (not shown) and the web server 311 run, for example, TCP/IP (Transmission Control Protocol/Internet Protocol) to communicate among themselves as well as to other external systems (not shown). One of ordinary skill in the art would recognize that other transport layer protocols can be utilized (e.g., User Datagram Protocol (UDP)).

The settlement system 301 maintains connections with the ISPs A–C via the switch 303, which interconnects the various ISPs A–C. As shown, ISP A includes a router 313 that is attached to a monitoring device 315. ISPs B and C also possess routers 317 and 319, respectively. These routers 313, 317, and 319 connect to switch 303. The switch 303 may be frame-based or cell-based, and can establish physical or virtual connections. According to one embodiment of the present invention, switch 303 is an ATM switch.

The ISPs A–C contact the web server site to set up the desired connections. As discussed in FIG. 2, the providers A–C can set their rates. If an ISP decides to establish interconnection with another ISP, the ATM switch 303 establishes a virtual connection between the two networks of the ISPs. The traffic monitor 307 queries the switch 303 to collect traffic statistics of the ISPs A–C via SNMP (Simple Network Management Protocol) or by other passive monitoring means. Thereafter, the traffic monitor 307 forwards the collected traffic statistics to the settlement database 309 for storage. As will be more fully discussed with respect to FIG. 4, the data that stored in the settlement database 309 are utilized in the reconciliation process.

The settlement system 301 provides a portal that permits any one of the participating providers A–C to access using the web server 311. An operator of the ISP can enter an account number and view the traffic statistics, as well as view the results of the reconciliation. In addition to settling network usage, the settlement system 301 can facilitate maintaining quality of service (QoS) across the Internet.

Many QoS mechanisms exist within the internetworking devices and protocols. A packet that is exchanged via the IXP 101 may possess settings in its header defining a certain quality of service. Under a zero-cost scheme, the receiving ISP has no obligation or incentive to honor the priority settings of another ISP, as this entails additional uncompensated costs. With the settlement system 301 acting as a clearing house, the ISPs can specify higher a price for high priority treatment. That is, if the priority bit is set to “1”, indicating high priority, a higher price can be readily applied; in the event of low or normal priority (i.e., priority bit is “0”), the regular price is applied.

If the packet is an IP (Internet Protocol) packet, the packet contains a TYPE OF SERVICE field in the header that specifies how the packet should be handled. In particular, the TYPE OF SERVICE field supports prioritization levels, enabling the source host to indicate the importance of each packet; for example, the source host can request low delay, high throughput, or high reliability. It should be noted that although the source host can provide a means to request these services.

The settlement system 301 advantageously provides an effective approach to honoring these QoS mechanisms. Upon detection that the packet is of high priority, the settlement system 101 can apply a different rate structure. For example, a settlement agreement between providers A and B may specify that provider B accepts low priority traffic at $7/Mbps and high priority traffic at $10/Mbps. In this manner, provider B has financial incentive to honor the QoS mechanism of provider A; in turn, the provider A can promote its QoS service to its customers.

Figure 4:
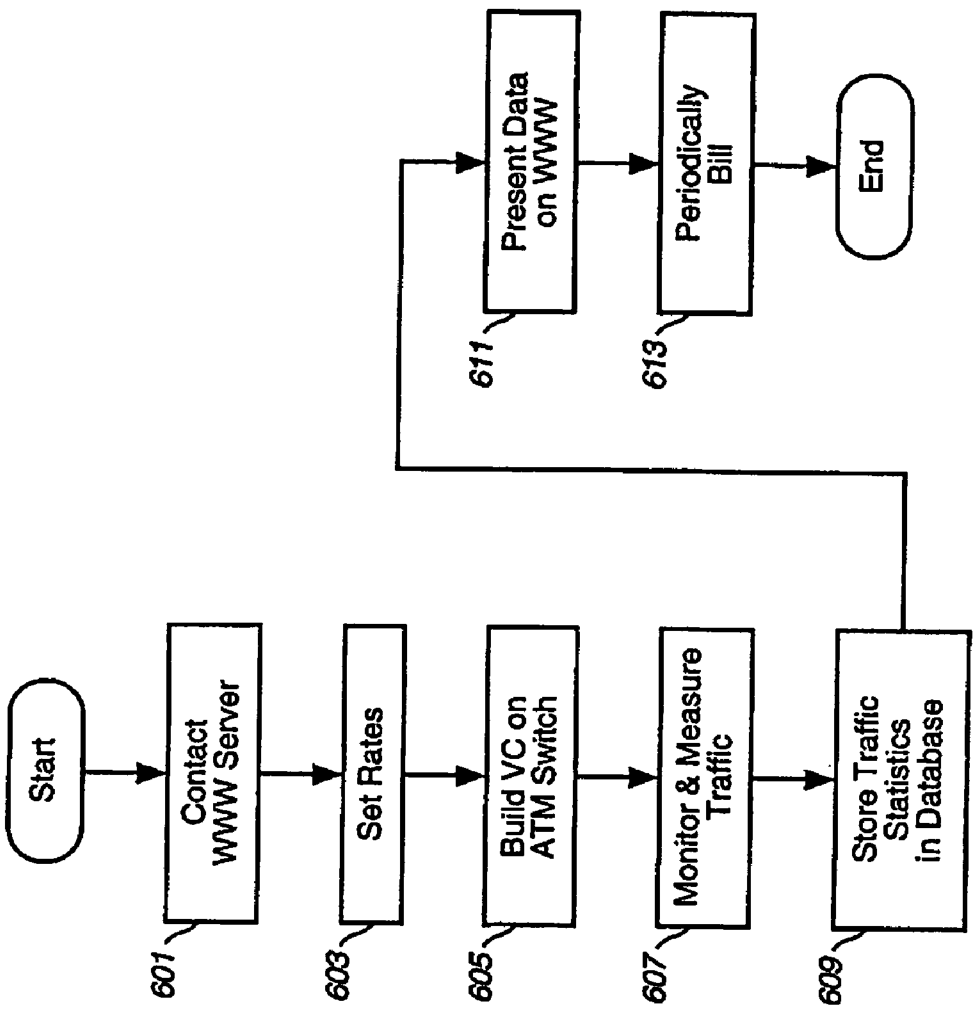
FIG. 4 is a flow chart of the operation of the settlement system of FIG. 3.

FIG. 4 shows a flow chart of the operation of the settlement system of FIG. 3. In step 401, using a client station, an operator of an ISP accesses the web server 311. Next, the operator specifies the rate information associated with one or more interconnections, per step 403. The connection, as in step 405, is accordingly established; for example, the ATM switch 303 sets up one or more virtual circuits, as appropriate. Details of the establishment of a virtual circuit is described in Handel et al., “ATM Networks: Concepts, Protocols, Applications,” Addison-Wesley Pub. Co., 1998, which is incorporated herein by reference.

Thereafter, the traffic monitor 307 collects traffic statistics of the established virtual circuits (step 407) and stores these traffic statistics in the settlement database 309 (step 409). The traffic statistics are then retrieved by the web server 311 and made available to the ISPs (step 411). In step 413, the server 311 periodically settles the various accounts and optionally directly bills the ISPs A–C.

Figure 6:
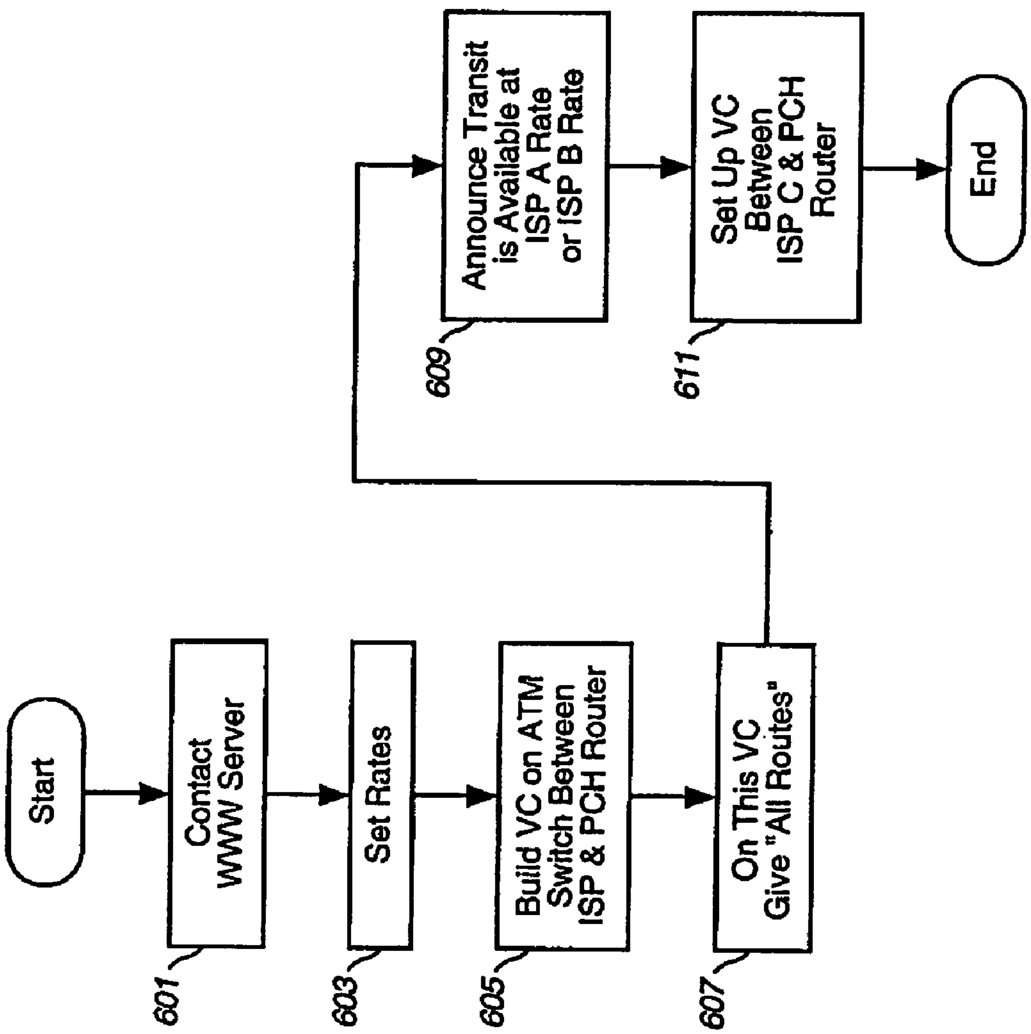
FIG. 6 is a flow chart of the operation of the settlement system of FIG. 5.

FIG. 5 shows a diagram of a settlement system with routing capability to provide network usage reconciliation, according to an embodiment of the present invention. The settlement system 501 of FIG. 5 contains all the components of the settlement system 301 of FIG. 3, with the addition of a router 503. The router 503 supports the concept of a “blind” interconnection, as previously discussed by learning all the routes of the participating ISPs. The router 503 occupies a port on the ATM switch 303. In an exemplary embodiment, the router 503 is a high-density, high-speed enterprise router; for example, router 503 can be implemented using the Cisco 7xxx Series routers, which is manufactured by Cisco Corporation. FIG. 6 describes the operation of the settlement system 501. Many mechanisms are provided by commercial routers and switches to rate limit the amount of traffic that a party sends to another. One such mechanism is the Committed Access Rate (CAR) feature available on Cisco routers. In this manner, any ISP can limit.

The blind mode of operation advantageously broadens the audience of providers that may interconnect with each other. For instance, in the conventional approach, larger service providers are reluctant to connect with small service providers for the reasons previously discussed. Under a blind mode, the identity of a provider is not known to the other providers, eliminating any political considerations from the negotiation of network capacity. As a result, the large providers are more inclined to sell transit traffic if they do not have to reveal their identity. To implement this blind approach, the settlement system 501 utilizes router 117 to provide Layer 3 services. IXP 101 (FIG. 1), hence, can collect routing information from the various providers and serve as an intermediary. In contrast, the conventional exchange points typically offer only Layer 2 services.

Connectivity on the Internet is the result of accepting and using a “route announcement” from other networks. Networks exchange these routing announcements using a routing protocol. Classless Inter-Domain Routing (CIDR) is one mechanism for describing networks on the Internet. CIDR employs two components: an IP address that describes the start of its address range, and a prefix length that describes the bounds of the announcement. A network with a prefix length of 24 represents 256 addresses, a 23 is 512 addresses, a 16 is 65,536 addresses, and so on. With knowledge of the various routes within the networks of the participating providers, the router 503 in conjunction with the ATM switch 303 can readily forward traffic from any provider to any other provider.

FIG. 6 shows a flow chart of the operation of the settlement system of FIG. 5. In step 601, an operator of an ISP accesses the web site on web server 311, and specifies a rate for the blind transit mode (step 603). A virtual circuit (which may be Permanent or Switched) is established by the ATM switch 303 between the network of the ISP and the router 503, per step 605. The router 503 stores all transit routes for this virtual circuit. In contrast, the settlement system 301 (FIG. 3) provides only a subset of the total routes. Steps 601–607 are performed for all participating ISPs, which in this case are ISPs A–C. In step 609, the PCH 501, via server 311, announces as an available service to other ISPs that transit service is available. The PCH 501 can add a margin to the specified prices for providing this service. Assuming that ISPs A and B seeks to sell excess capacity on their networks, and ISP C is a buyer, ISP C contacts the web server 311, which initiates establishment of a virtual circuit between the network of ISP C and the router 503. ISP C can specify any number of connection criteria (e.g., rate, price, performance metrics, etc.). The ATM switch 303 performs this VC establishment (step 611). The router 503, as in step 613, routes the traffic from the network of ISP C to any one of the routes of ISPs A and B based upon the criteria that ISP C has specified without regard to the identity of the participating ISP (e.g., A and B).

Figure 7:
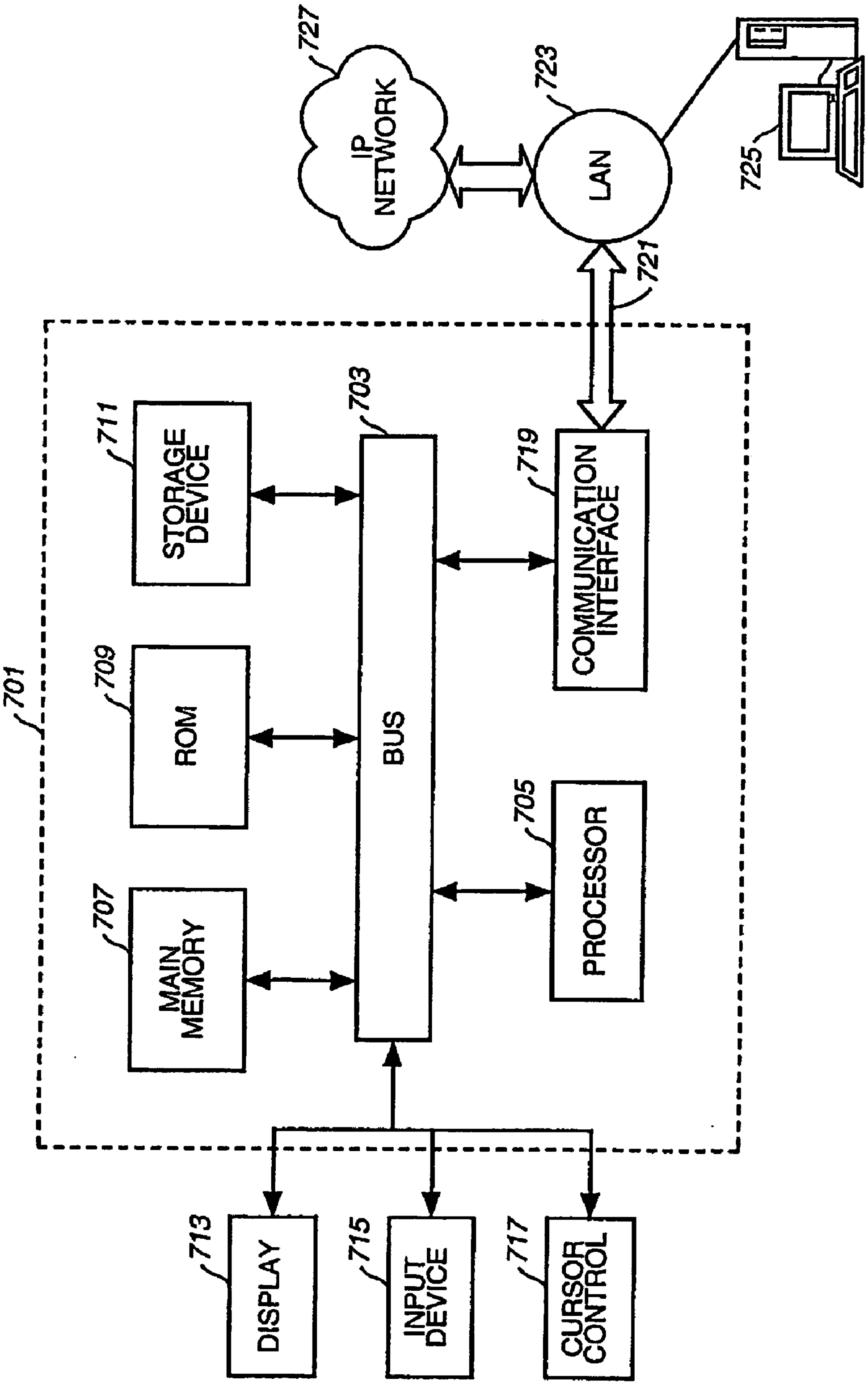
FIG. 7 is a diagram of a computer system that can perform in accordance with an embodiment of the present invention.
Figure 8:
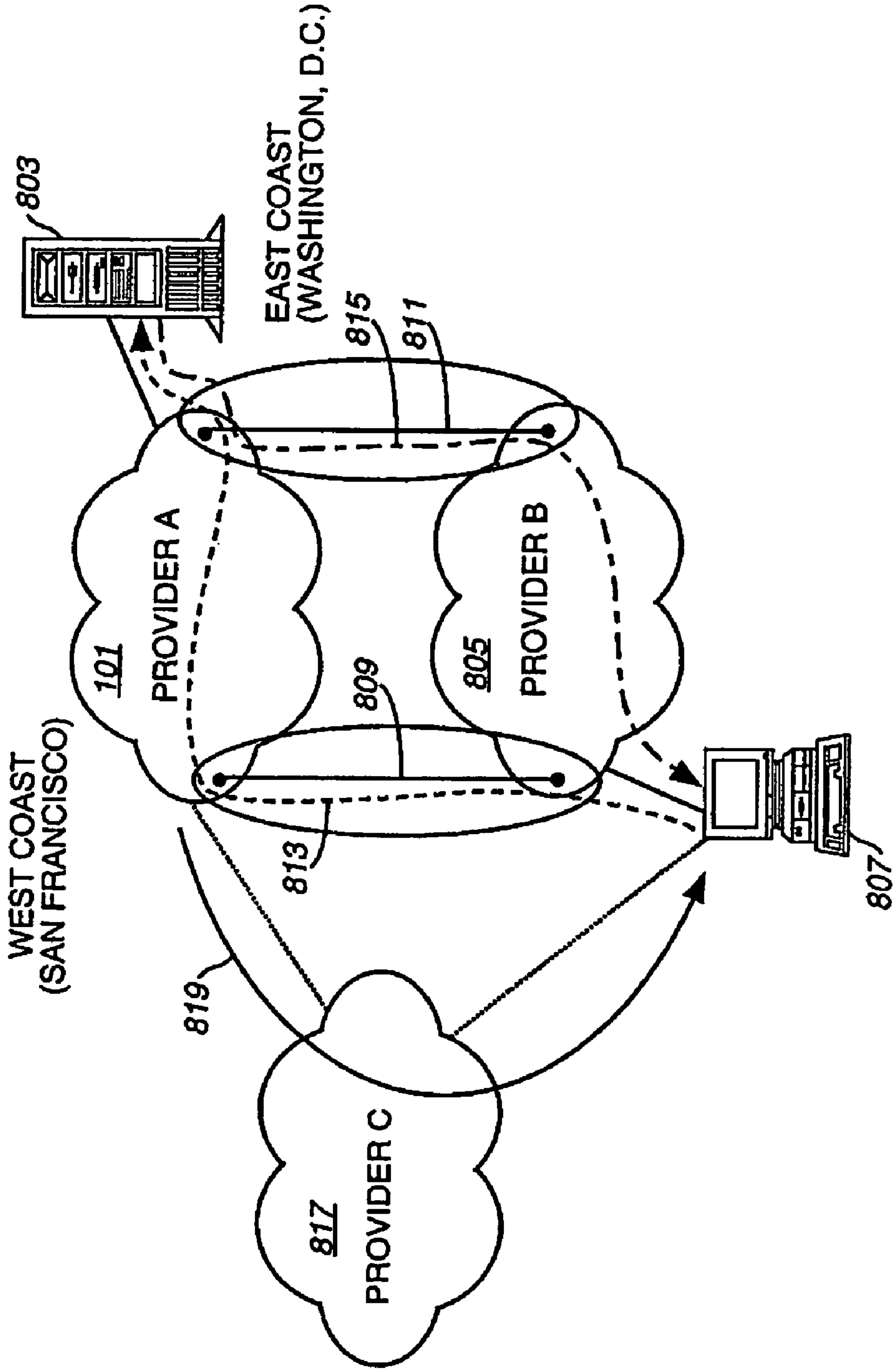
FIG. 8 is a diagram of the traditional interconnection of the networks without settlement capability.

FIG. 7 illustrates a computer system 701 upon which an embodiment according to the present invention may be implemented to provide settlement of network usage among multiple network service providers. For example, computer system 701 can perform the functions of the web server 311 and the functions of the traffic monitor 307 (FIG. 3). Computer system 701 includes a bus 703 or other communication mechanism for communicating information, and a processor 705 coupled with bus 703 for processing the information. Computer system 701 also includes a main memory 707, such as a random access memory (RAM) or other dynamic storage device, coupled to bus 703 for storing information and instructions to be executed by processor 705. In addition, main memory 707 may be used for storing temporary variables or other intermediate information during execution of instructions to be executed by processor 705. Computer system 701 further includes a read only memory (ROM) 709 or other static storage device coupled to bus 703 for storing static information and instructions for processor 705. A storage device 711, such as a magnetic disk or optical disk, is provided and coupled to bus 703 for storing information and instructions.

Computer system 701 may be coupled via bus 703 to a display 713, such as a cathode ray tube (CRT), for displaying information to a computer user. An input device 715, including alphanumeric and other keys, is coupled to bus 703 for communicating information and command selections to processor 705. Another type of user input device is cursor control 717, such as a mouse, a trackball, or cursor direction keys for communicating direction information and command selections to processor 705 and for controlling cursor movement on display 713.

According to one embodiment, processing service selection information is provided by computer system 701 in response to processor 705 executing one or more sequences of one or more instructions contained in main memory 707. Such instructions may be read into main memory 707 from another computer-readable medium, such as storage device 711. Execution of the sequences of instructions contained in main memory 707 causes processor 705 to perform the process steps described herein. One or more processors in a multi-processing arrangement may also be employed to execute the sequences of instructions contained in main memory 707. In alternative embodiments, hard-wired circuitry may be used in place of or in combination with software instructions. Thus, embodiments are not limited to any specific combination of hardware circuitry and software.

Further, the data structure of FIG. 2B may reside on a computer-readable medium. The term "computer-readable medium" as used herein refers to any medium that participates in providing instructions to processor 705 for execution. Such a medium may take many forms, including but not limited to, non-volatile media, volatile media, and transmission media. Non-volatile media includes, for example, optical or magnetic disks, such as storage device 711. Volatile media includes dynamic memory, such as main memory 707. Transmission media includes coaxial cables, copper wire and fiber optics, including the wires that comprise bus 703. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 705 for execution. For example, the instructions may initially be carried on a magnetic disk of a remote computer. The remote computer can load the instructions, relating to computing settlement information, remotely into its dynamic memory and send the instructions over a telephone line using a modem. A modem local to computer system 701 can receive the data on the telephone line and use an infrared transmitter to convert the data to an infrared signal. An infrared detector coupled to bus 703 can receive the data carried in the infrared signal and place the data on bus 703. Bus 703 carries the data to main memory 707, from which processor 705 retrieves and executes the instructions. The instructions received by main memory 707 may optionally be stored on storage device 711 either before or after execution by processor 705.

Computer system 701 also includes a communication interface 719 coupled to bus 703. Communication interface 719 provides a two-way data communication coupling to a network link 721 that is connected to a local network 723. For example, communication interface 719 may be a network interface card to attach to any packet switched local area network (LAN). As another example, communication interface 719 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 719 sends and receives electrical, electromagnetic and/or optical signals that carry digital data streams representing various types of information.

Network link 721 typically provides data communication through one or more networks to other data devices. For example, network link 721 may provide a connection through local network 723 to a host computer 725 or to data equipment operated by a service provider, which provides data communication services through an IP (Internet Protocol) network 727 (e.g., the Internet). LAN 723 and IP network 727 both use electrical, electromagnetic or optical signals that carry digital data streams. The signals through the various networks and the signals on network link 721 and through communication interface 719, which carry the digital data to and from computer system 701, are exemplary forms of carrier waves transporting the information. Computer system 701 can transmit notifications and receive data, including program code, through the network(s), network link 721 and communication interface 719.

The techniques described herein provide several advantages over prior approaches to interconnecting multiple networks of different network service providers. Based upon a Pay to Send financial model, the settlement system, according to one embodiment of the present invention, operates in two modes: a transparent mode and a blind mode. The settlement system includes a web server that collects rate information from the provider and establishes the settlement agreements. A router within the settlement system provides Layer 3 services to enable the blind mode of operation. As a clearing house, the settlement system facilitates the establishment of settlement agreements among many ISPs, thereby expanding the reach of the Internet. In addition, the intermediary settlement system provides QoS settlement among the many networks of the ISPs.

Obviously, numerous modifications and variations of the present invention are possible in light of the above teachings. It is therefore to be understood that within the scope of the appended claims, the invention may be practiced otherwise than as specifically described herein.

What is claimed is:

1. A method of providing settlement of traffic exchange associated with a plurality of networks of a plurality of network service providers, the method comprising:

determining a settlement agreement between a first one of the network service providers and a second one of the network service providers, the settlement agreement specifying rate information associated with traffic exchange between the corresponding networks of the first network service provider and the second network service provider;

monitoring the traffic exchange between respective networks of the first network service provider and the second network service provider; and computing settlement information based upon the monitoring step, the settlement information includes usage cost differential information that is based upon the rate information.

2. The method according to claim 1, wherein the determining step comprises:

collecting rate information from each of the plurality of network service providers; and receiving interconnectivity selection information from the first network service provider for establishment of a connection between the network of the first network service provider and the network of the second network service provider, wherein the interconnectivity selection information is based upon a predetermined parameter that comprises at least one of the collected rate information, performance metrics of the connection, and business relationship between the first network service provider and the second network service provider.

3. The method according to claim 2, wherein the collecting step and receiving step are performed by a web server.

4. The method according to claim 2, further comprising:

displaying the rate information anonymously with respect to identity of the plurality of network service providers.

5. The method according to claim 4, wherein the rate information in the displaying step represents a temporary offer, the temporary offer corresponding to excess capacity of the respective networks.

6. The method according to claim 1, further comprising:

establishing a connection that interconnects the first network and the second network according to the settlement agreement.

7. The method according to claim 6, wherein the establishing step is performed by an Asynchronous Transfer Mode (ATM) switch.

8. The method according to claim 7, further comprising:

providing routing information associated with the connection via a router that communicates with the ATM switch.

9. The method according to claim 1, further comprising:

storing the rate information of the settlement agreement in a settlement database.

10. The method according to claim 1, wherein the rate information in the determining step includes at least one of a global rate that is offered by the first network service provider to all other network service providers and a specific rate that is offered by the first network service provider exclusively to the second network service provider.

11. The method according to claim 1, wherein the settlement agreement in the determining step specifies quality of service (QoS) parameters, the method further comprising:

establishing a connection between the network of the first network service provider and the network of the second network service provider based upon the specified QoS parameters.

12. A communication system for supporting settlement of network usage associated with a plurality of network service providers, comprising:

a plurality of networks corresponding to the plurality of network service providers;

a processor configured to determine a settlement agreement between a first one of the network service providers and a second one of the network service providers, the settlement agreement specifying rate information associated with traffic exchange between the corresponding networks of the first network service provider and the second network service provider;

a traffic monitor configured to measure a first source traffic originating from a first one of the plurality of networks to a second one of the plurality of networks and a second source traffic originating from the second network to the first network; and a settlement database communicating with the processor, the database storing the settlement agreement and traffic statistics corresponding to the measured first source traffic and the second source traffic, wherein the processor is configured to compute settlement information based upon the stored traffic statistics, the settlement information including usage cost differential information that is based upon the rate information.

13. The system according to claim 12, wherein the processor collects rate information from each of the plurality of network service providers and receives interconnectivity selection information from the first network service provider for establishment of a connection between the network of the first network service provider and the network of the second network service provider, the interconnectivity selection information being based upon a predetermined parameter that comprises at least one of the collected rate information, performance metrics of the connection, and business relationship between the first network service provider and the second network service provider.

14. The system according to claim 12, wherein the settlement agreement specifies quality of service (QoS) parameters, the connection between the respective networks of the first network service provider and the second network service provider being based upon the specified QoS parameters.

15. The system according to claim 12, wherein the processor resides in a web server.

16. The system according to claim 15, wherein the web server instructs a client station to display the rate information anonymously with respect to identity of the plurality of network service providers.

17. The system according to claim 12, wherein the rate information represents a temporary offer, the temporary offer corresponding to excess capacity of the respective networks.

18. The system according to claim 12, further comprising:

a connection that interconnects the first network and the second network according to the settlement agreement.

19. The system according to claim 18, further comprising:

an Asynchronous Transfer Mode (ATM) switch configured to establish the connection.

20. The system according to claim 18, further comprising:

a router communicating with the processor, the router being configured to provide routing information associated with the connection.

21. The system according to claim 12, wherein the rate information includes at least one of a global rate that is offered by the first network service provider to all other network service providers and a specific rate that is offered exclusively by the first network service provider to the second network service provider.

22. A computer readable medium containing program instructions for execution on a computer system, which when executed by a computer, cause the computer system to perform method steps for providing settlement of traffic exchange associated with a plurality of networks of a plurality of network service providers, the method comprising the steps of:

determining a settlement agreement between a first one of the network service providers and a second one of the network service providers, the settlement agreement specifying rate information associated with traffic exchange between the corresponding networks of the first network service provider and the second network service provider;

receiving traffic statistics of the respective networks of the first network service provider and the second network service provider; and computing settlement information based upon the receiving step, the settlement information includes usage cost differential information that is based upon the rate information.

23. The computer-readable medium according to claim 22, wherein the determining step comprises:

collecting rate information from each of the plurality of network service providers; and receiving interconnectivity selection information from the first network service provider for establishment of a connection between the network of the first network service provider and the network of the second network service provider, wherein the interconnectivity selection information is based upon a predetermined parameter that comprises at least one of the collected rate information, performance metrics of the connection, and business relationship between the first network service provider and the second network service provider.

24. The computer-readable medium according to claim 22, wherein the method further comprises:

displaying the rate information anonymously with respect to identity of the plurality of network service providers.

25. The computer-readable medium according to claim 24, wherein the rate information in the displaying step represents a temporary offer, the temporary offer corresponding to excess capacity of the respective networks.

26. The computer-readable medium according to claim 22, wherein the method further comprises:

initiating establishment of a connection that interconnects the first network and the second network according to the settlement agreement.

27. The computer-readable medium according to claim 22, wherein the method further comprises:

sending the rate information of the settlement agreement to a settlement database.

28. The computer-readable medium according to claim 22, wherein the rate information in the determining step includes at least one of a global rate that is offered by the first network service provider to all other network service providers and a specific rate that is offered by the first network service provider exclusively to the second network service provider.

29. The computer-readable medium according to claim 22, wherein the settlement agreement in the determining step specifies quality of service (QoS) parameters, the method further comprising:

initiating establishment of a connection between the network of the first network service provider and the network of the second network service provider based upon the specified QoS parameters.

* * * * *